Dec. 1, 1953  K. J. AVERSTEN  2,661,428
TRANSPORTABLE WELDING APPARATUS
Filed May 29, 1951  2 Sheets-Sheet 1
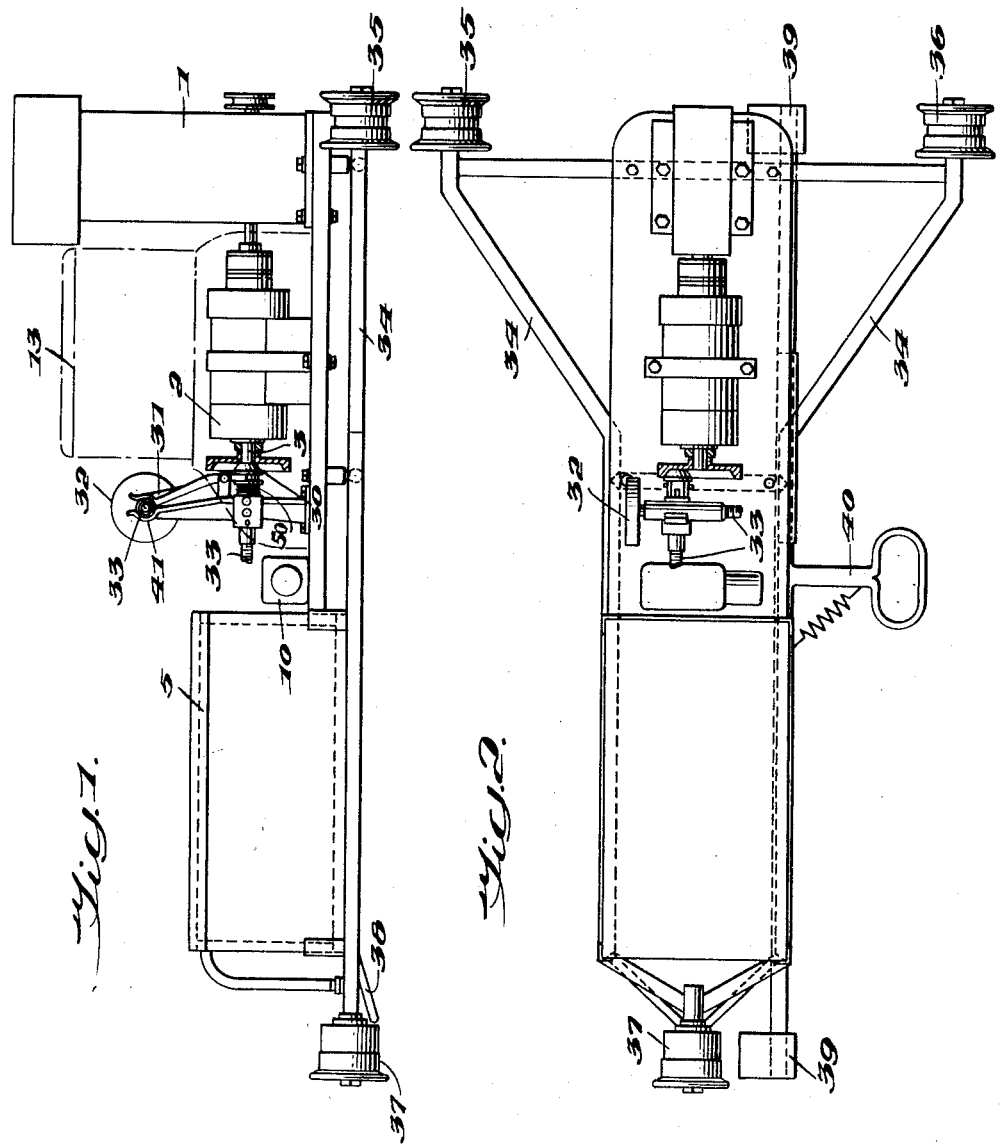
INVENTOR
KARL JOEL AVERSTEN,
BY Robert B. Pearson
ATTORNEY

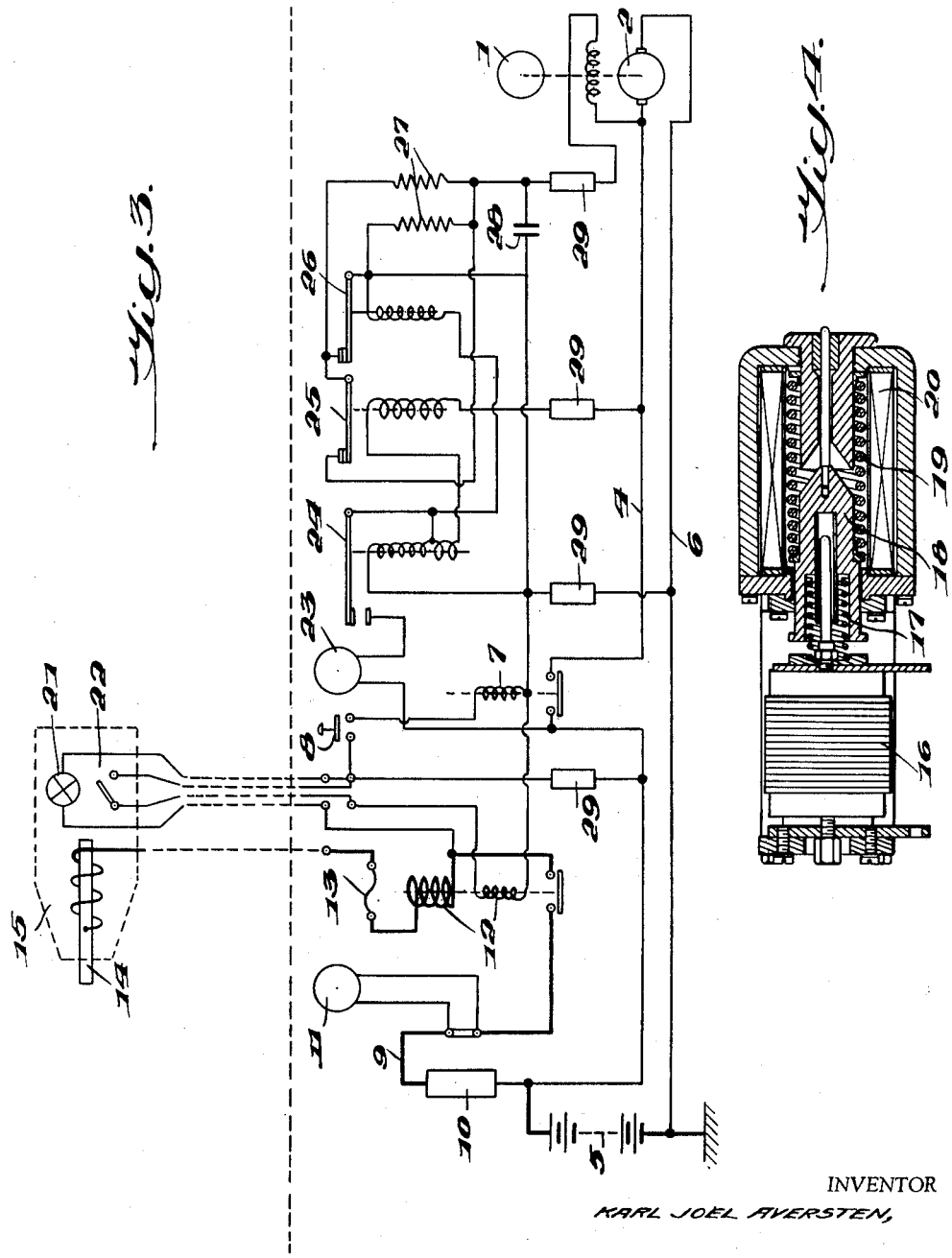

Patented Dec. 1, 1953

2,661,428

UNITED STATES PATENT OFFICE 2,661,428

TRANSPORTABLE WELDING APPARATUS

Karl Joel Aversten, Lidingo, Sweden, assignor to Svenska Aktiebolaget Gasaccumulator, Lidingo, near Stockholm, Sweden, a corporation of Sweden Application May 29, 1951, Serial No. 228,929

Claims priority, application Sweden June 1, 1950

5 Claims. (Cl. 290—1)

The present invention refers to a transportable welding apparatus, particularly for intermittent welding in short intervals. More specifically, the apparatus is adapted for arc-welding pins or studs or the like in localities where no welding current source is available.

The apparatus according to the invention is characterized by a combustion engine, an electric generator driven by the engine, and a battery electrically connected to the generator and to the welding device through a current regulator. Furthermore, the complete apparatus is preferably mounted on a rail truck provided with a guide bar serving to facilitate removal of the truck from the rails across a rail.

The invention is further illustrated in the form of an embodiment thereof shown by way of example as comprising a transportable welding apparatus according to the invention for welding electric rail bonds. Fig. 1 is a side elevation of the apparatus, Fig. 2 a plan view thereof. Fig. 3 shows a diagram of the electric circuits of the apparatus. Fig. 4 is a longitudinal section of a current regulator forming part of the apparatus.

A gasoline engine 1 has its axle connected with the axle 3 of a direct current generator 2. One output conductor 4 of the generator is connected to an electric battery 5 and the other conductor 6 is grounded. In circuit with the conductor 4 there is connected a start relay 7 associated with a starting button 8. A welding conductor 9 connects the battery 5 through a current regulator 10, an ammeter 11, a welding relay 12 and a wire breaker 13 to an electrode 14 of a stud welding gun 15 of known construction. The said current regulator 10, shown in Fig. 4, comprises conductive coal disks 16, a compression spring 17, an iron core 18, a control spring 19 and a coil 20. The springs 18 and 19 are adjusted for providing a pressure on the disks 16 suitable for passing a predetermined current through the disk pile. If the current should surpass the desired value, the core 18 is drawn by the coil 20 against the action of the spring 19 to the right with reference to Fig. 4, whereby the spring 17 is enabled to expand and the pressure on the disks is decreased. This reduces the current through the disks to the desired value. The wire breaker is of a type described in my application Serial No. 149,434, filed March 13, 1950. The control circuit or charging circuit for the battery 5 is connected to the welding relay 12 and comprises a signal light 21 and a push button 22 included in the welding gun 15, as well as an ammeter 23, a return current relay 24, an overcurrent relay 25, an overvoltage relay 26, a resistor 27, a condenser 28, and fuses 29.

The generator axle 3 is provided with a clutch 30, which is operated by means of a control lever 31. The lever 31, in cooperation with a support 41, is adapted to support removably a grinding wheel 32 and to disengage the clutch when loaded by the wheel. The wheel 32 is connected through a flexible shaft 33 to one half of the coupling 30. When the grinding wheel 32 is lifted, the clutch 30 is brought into engagement (for instance by a spring 50) and the wheel may be used for polishing.

The entire apparatus is mounted on a truck comprising a comparatively light tube frame 34 and three wheels 35, 36, and 37, the first two of which are arranged to run on one rail of a railway track and are flanged on both sides of the rail. The wheel 37 runs on the other rail and is flanged only on the outside of the rail. Inwards of this wheel, the frame is provided with a guide 38 extending down to the lowermost part of the wheel. The ground connections of the battery 5 and the generator 2 are grounded to the frame 34 and thus to earth through the wheels and the rails. In order to avoid the necessity for passing the current through the wheel bearings, the current may be passed through brake shoes 39 adapted to swing towards the rails upon actuation of a brake lever 40 so as to rub lightly against the rails and provide good contact therewith.

The welding apparatus described may easily be operated and transported by one man. When it is to be removed from the track the wheels 35 and 36 may be lifted with their flanges above the rail and with the guide sliding on the rail, thus facilitating the necessary displacement and swinging of the apparatus when removing it from the track. The generator is used for starting the engine and during the work the engine runs continuously, whereby the battery is continuously loaded by the generator with a certain amperage. A predetermined amperage, as controlled by the regulator 10, is obtained at the welding gun for the bond welding process, for instance according to my applications Serial Nos. 137,140, filed January 6, 1950, now Patent No. 2,604,570, issued July 22, 1952; 149,435 and 149,436, filed March 13, 1950. The apparatus may also be used for other welding operations, which require current to be applied only for short intervals, which may, however, recur at a comparatively high frequency dependent on the current generating capacity of the arrangement.

The invention is not to be considered as limited to the embodiment shown and described, which may be modified within the scope of the invention. For instance, the truck may have a pair of wheels running on each rail or may have ordinary road wheels. The current regulator can be replaced by a manually adjustable resistor. The wire breaker may be disposed outside the truck or may be replaced by some other type of breaker.

What is claimed is:

1. A transportable welding apparatus, comprising a combustion engine, an electric generator driven by said engine, an electric battery connected to said generator and connected to a welding device through a current regulator, and means automatically adjusting said current regulator in response to said battery current.

2. An apparatus as claimed in claim 5, in which there is provided inwards of the wheel or wheels on said other side a guide extending to the lowermost part of said wheel or wheels.

3. An apparatus as claimed in claim 5, in which said truck supports a wire circuit breaker included in a welding current conductor connected to said battery.

4. An apparatus as claimed in claim 5, in which said battery and said generator are grounded to the framework of said truck, and brakes extending from said framework to the rails and forming a connection to ground.

5. A transportable welding apparatus comprising, a combustion engine, an electric generator driven by said engine, an electric battery connected to said generator, a welding device, a current regulator, means connecting said welding device to said battery through said current regulator, means automatically adjusting said current regulator in response to said battery current, and a supporting rail truck for mounting the above apparatus and including wheels on one side having a pair of flanges adapted to surround a rail, and wheels on the other side being provided with external flanges only.

KARL JOEL AVERSTEN.

References Cited in the file of this patent

UNITED STATES PATENTS

| Number | Name | Date |
|---|---|---|
| 264,481 | Sheffield | Sept. 19, 1882 |
| 493,672 | Badt | Mar. 21, 1893 |
| 565,139 | Gale | Aug. 4, 1896 |
| 1,067,624 | Simard et al. | July 15, 1913 |
| 1,095,300 | Varney | May 5, 1914 |
| 1,444,425 | Ogden | Feb. 6, 1923 |
| 1,818,047 | Dickey et al. | Aug. 11, 1931 |
| 1,850,650 | Attwood | Mar. 22, 1932 |
| 1,869,640 | Wells et al. | Aug. 2, 1932 |
| 2,040,215 | Rava | May 12, 1936 |
| 2,126,336 | Mall | Aug. 9, 1938 |
| 2,168,927 | Adams et al. | Aug. 8, 1939 |
| 2,172,026 | Longley | Sept. 5, 1939 |
| 2,223,692 | Marec | Dec. 3, 1940 |
| 2,360,420 | Hill | Oct. 17, 1944 |
| 2,524,257 | Harrah | Oct. 3, 1950 |
| 2,604,570 | Aversten | July 22, 1952 |

FOREIGN PATENTS

| Number | Country | Date |
|---|---|---|
| 67,013 | Denmark | June 14, 1948 |
| 256,762 | Italy | Jan. 17, 1928 |
| 799,676 | France | Apr. 11, 1936 |